United States Patent Office 3,450,150
Patented June 17, 1969

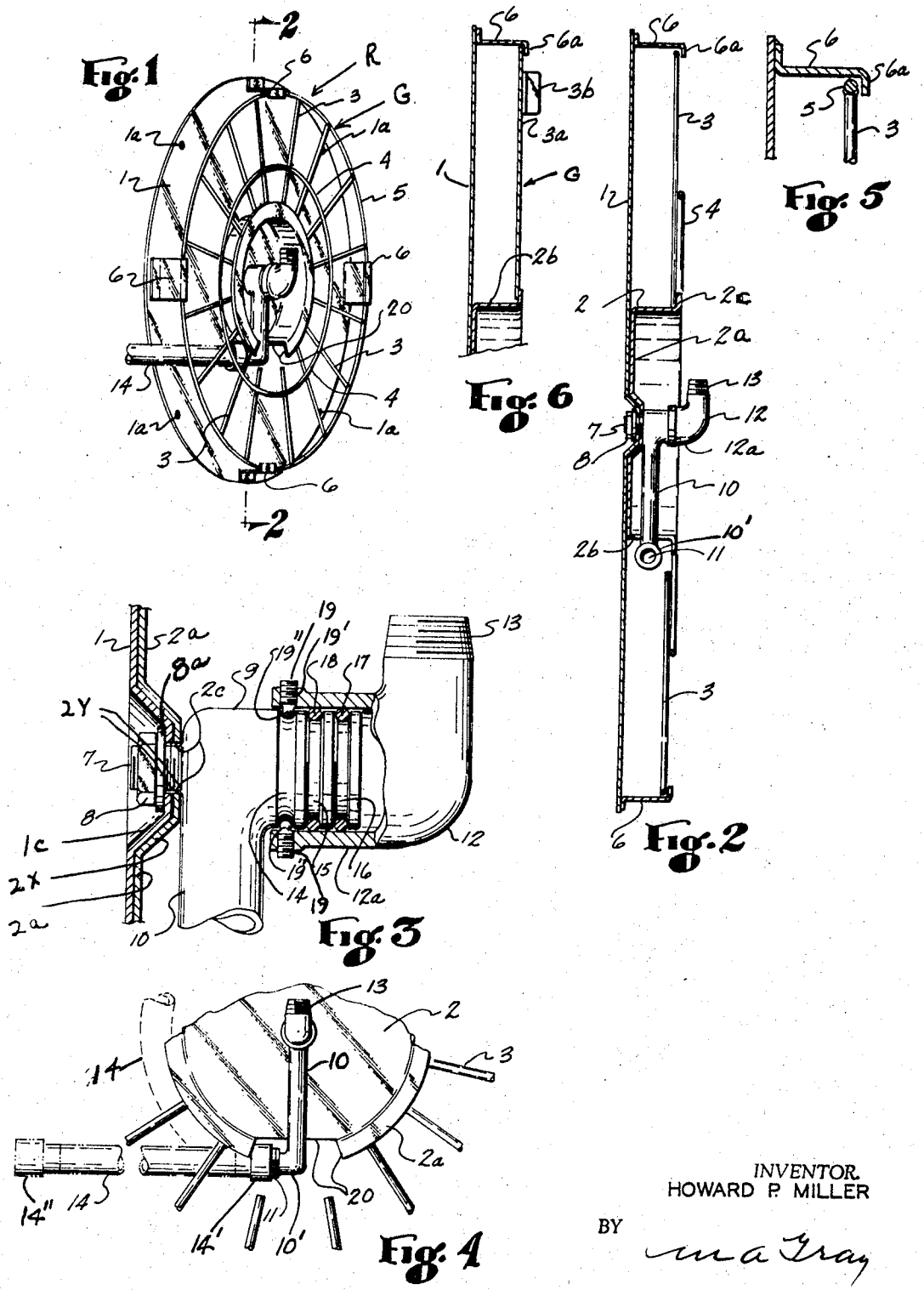

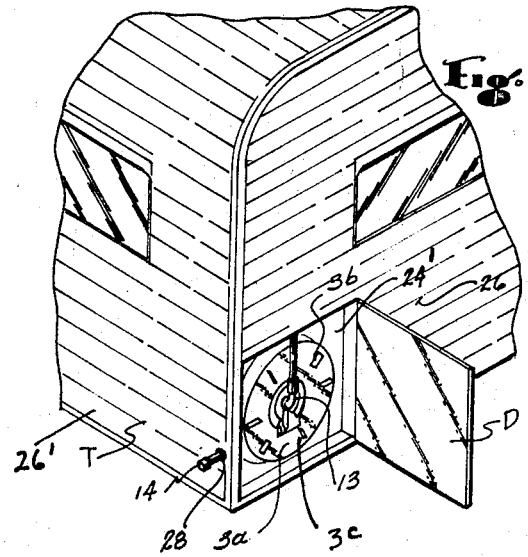
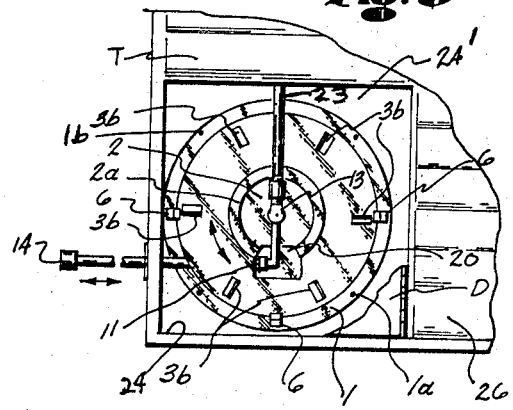
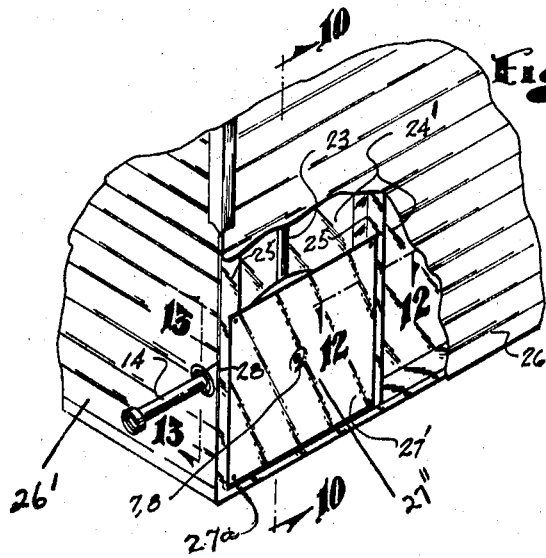
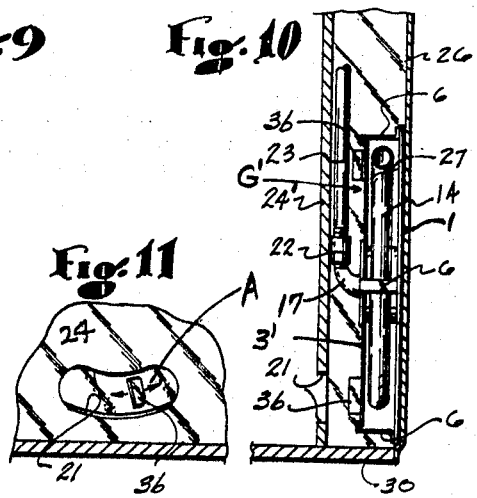
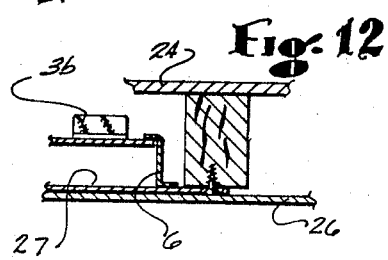
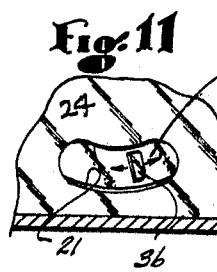
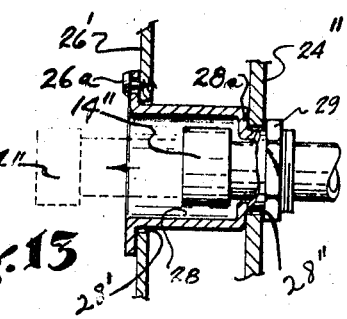
INVENTOR
HOWARD P. MILLER

3,450,150
HOSE REEL AND ENCLOSURE THEREFOR
Howard P. Miller, 2238 N. San Antonio Ave.,
Pomona, Calif. 91767
Filed July 25, 1966, Ser. No. 567,425
Int. Cl. B65h 75/46; F16l 3/16
U.S. Cl. 137—355.16                    1 Claim

ABSTRACT OF THE DISCLOSURE

A hose device concealingly mounted within the body of a mobile camper-trailer for enabling the water reservoir thereof to be filled and providing a water supply for use outside of the camper, wherein a hose reel and an extensible outlet fitting are arranged within adjacent compartments and connected to the reservoir through the reel hub. The outlet fitting serves as a closure for one compartment and a removable closure member covers the reel compartment.

---

This invention relates to a hose reel adapted to be mounted on or stored and concealed within a camper or trailer body and the like.

Heretofore, it has been the practice to provide campers and trailers and the like with a water storage tank for furnishing water therewithin, but there has been no provision for readily replenishing this water supply by connecting the same with a source of supply outside of the camper.

It is, therefore, the principal object of the present invention to provide a concealable hose reel and storage device wherein the hose arranged thereon is adapted to be readily removed therefrom for subsequent use as a connection to a source of supply outside of the camper.

Another object is the provision of a novel hose and reel combination which is so constructed that hose may be conveniently and compactly coiled thereon and the device readily stored within and/or on the wall of a camper or trailer, and building.

A further object is to provide a combination wall storage compartment and hose and reel arrangement which is particularly suitable for use with a camper and the like so as to be conveniently concealably stored thereon without marring the appearance of the camper body, and still be readily accessible for use in connecting the camper storage tank with a source of water supply removed from the camper so that the tank supply may be replenished.

These and other objects and advantages will be apparent as the specification is considered with the accompanying drawings in which preferred embodiments of the invention are illustrated by way of example, and wherein:

FIGURE 1 is a perspective view of the hose reel and internal and pipe coupling connections;

FIGURE 2 is a sectional view of FIGURE 1 taken substantially on lines 2—2 looking in the direction of the arrows;

FIGURE 3 is an enlarged view partly in section of the pipe couplings for the hose and reel when attached to the internal wall structure of a camper or the like;

FIGURE 4 is a side view of FIGURE 1, partly in section;

FIGURE 5 is an enlarged sectioned view, partly in section, of an upper portion of the reel shown in FIGURE 2;

FIGURE 6 shows a view partly in section, of a modified form of hose reel;

FIGURE 7 is a perspective view of a portion of a camper showing the hose reel and pipe coupling therefor arranged in a wall compartment thereof;

FIGURE 8 is an enlarged front view of FIGURE 7, with the compartment door partly broken away;

FIGURE 9 is a modified compartment enclosure for the hose and reel means;

FIGURE 10 is a view of FIGURE 9, partly in section, taken substantially on lines 10—10;

FIGURE 11 is a view of a slot and lug means of the side cover of the hose reel, partly in section;

FIGURE 12 is a sectioned view of FIGURE 9 taken substantially on lines 12—12; and FIGURE 13 is a view of the outer end of the hose and its movement through the outer wall of the camper when uncoiled from the reel, as taken on lines 13—13 of FIGURE 9.

Referring more particularly to the drawings, wherein similar reference characters designate like parts throughout the several views, the hose reel R includes a generally circular back plate 1 having a flat circular plate 2a of a relatively shallow and generally dish-shaped hub 2 projecting centrally therefrom and secured thereto, as will hereinafter be described. A grille member G, consisting of spaced concentric rings 4 and 5 inter-connected by spaced radial spokes 3 which are suitably connected thereto, is supported in spaced relationship with the back plate 1 by the lower ends of spokes 3 terminating short of the hub 2 and fitting behind an upturned annular rim 2c on the outer open end of hub 2, and the outermost ring 5 interengaging with the inturned ends 6a on the ends of spaced lugs 6. Thus, the grille may be readily removed from or adjusted relative to the back plate 1. As best shown in FIGURES 2 and 3, the back plate 1 and hub plate 2a are formed with inwardly and vertically bent complemental central portions 1c and 2x, respectively, and mating openings 2y so that the plates will closely interfit and are positioned against relative movement.

A pipe coupling 9 has a threaded bolt 7 rigidly formed thereon adjacent the upper end thereof which is adapted to project laterally through openings 2y and receive a nut 8 on the inner end thereof so that the coupling is rotatably mounted on the back plate 1 and reel hub plate 2a and will rotate together with the hub plate and hub. The side wall of hub 2 is cut away, as at 20, to provide clearance therethrough for a vertical section 10 of the coupling, as shown in FIGURES 1 and 4.

The lower end of coupling 9 is turned rearwardly and substantially parallel to the hub plate 2a, as at 10, and is threaded, as at 11, to threadedly receive fittings 14' on the ends of a suitable length of conventional flexible, rubber or plastic, garden hose 14. When the hose reel R is rotated in a counter clockwise direction, viewing FIGURES 1 and 4, the coupling 9 will rotate therewith and cause the flexible hose to bend and coil around the hub so that the convolutions will nest one above the other in single file and will be snugly confined thereon between the back plate 1 and grille G. This rotation of the hub and coupling can easily be effected by grasping one of the grille spokes 1a with the fingers, in an obvious manner.

As best shown in FIGURE 3, the upper end of pipe coupling 9 extends laterally at substantially a right angle to the vertical section 10 thereof, and is provided with spaced annular grooves 15, 16 which fits within the lower laterally extending end 12a of a generally L-shaped swivel pipe fitting 12. The latter is threadedly connected, as at 13, to the lower end of a pipe 23 in the camper body which extends to and is connected by suitable valves, not shown, to the usual camper water supply tank, also not shown. Threaded retaining screws 19 extending through threaded openings 19' in the end of fitting 12 are formed with ball portions 19" on the inner ends thereof which extend into one of the grooves 14 and when screwed thereinto will serve to interconnect the coupling 9 and fitting 12, but will permit swivelling movement therebetween, in an obvious manner, suitable sealing O-rings 17 and 18 are preferably arranged in the remaining grooves. In other words, the fitting 12 will remain rigidly connected to pipe 23 and the coupling will rotate relative thereto by virtue of the aforesaid swivel connection therebetween.

The hose reel hereinbefore described is preferably adapted to be arranged on and housed within the body of a camper or trailer T, for which purpose a sufficiently dimensioned storage compartment 24 is formed in the body thereof, as shown in FIGURES 7 to 11, which is preferably closed by a suitable closure door or the like, such as, door D hinged to camper side wall 26 and having a suitable latch thereon, not shown. When so housed within compartment 24, back plate 1 will be positioned against the flat rear wall 24' of the compartment and will be suitably and fixedly secured thereto by screws or the like 1b which extend through openings 1a in the plate, so that the reel will be rotatably housed therewithin.

When assembled, the threaded upper end 13 of swivel pipe fitting 12 is connected to the lower end of water tank supply pipe 23. A hose fitting 14" on the outer or free end of the hose 14, having its fitting 14' on the other end connected to the end 11 of coupling section 10, projects through and is usually housed within a sleeve member 28 (FIGURE 13) suitably extending through openings 28' and 28" in rear camper wall 26' and the inner wall 24" spaced therefrom, which sleeve is suitably anchored in opening 28', as at 26a. The inner end of sleeve 28 is reduced, as at 28a, so as to project through wall opening 28", and the inner reduced end 28a of sleeve 28 is threaded and receives a nut 29 thereon so that the inner end will be fixed relative to wall 24".

Thus, when it is desired to replenish the supply of liquid in the tank, the compartment door D may be unlatched and opened, as shown in FIGURE 7, whereupon hose reel may be rotated in a clockwise direction, viewing FIGURES 1 and 4, by engaging one of the spokes 1a and imparting a spinning movement to the reel. As the latter rotates clockwise, the coupling 9 will rotate therewith and cause the end of the hose 14 housed within the sleeve 28 to project therethrough until a sufficient length thereof extends exteriorly of the camper, generally as illustrated in FIGURE 8. It will, of course, be understood that the projecting end of the hose may be grasped and pulled until a length sufficient to permit attachment of the hose fitting 14" to any suitable source of water under pressure, not shown, so that water will be caused to flow through hose 14, pipe coupling 9, swivel pipe fitting 12 and thence through pipe 23 into the camper water supply tank, it being understood that appropriate valves, not shown, will be opened to effect such a flow. Upon completion of the aforesaid fitting operation, the valves will be closed, the fitting 14" disconnected from the outside water supply, and the hose 14 rewound upon the reel when the latter is again rotated in a counterclockwise direction, viewing FIGURES 1 and 4.

In an embodiment of the reel shown in FIGURES 7 and 8, the grille thereof may be covered by a circular cover plate 3a and suitably attached thereto. For example, clips 3b may be suitably arranged on the grille spokes 3 which will project through openings 3c in the plate and may be bent relative thereto so that plate 3a will be retained in position thereon. With this mounting arrangement, it is preferable that access to the hose reel be gained through an elongated, arcuate shaped opening 21 in the inner camper wall 24' so that one's fingers may be inserted therethrough to engage lugs 3b on spokes 3' on the hose reel grille G' to spin and rotate the hub and cause the hose 14 to be either projected through the camper wall opening for outside water source connecting purposes or to be retracted therethrough and recoiled on the hose reel, as has previously been described.

I claim:

1. In a mobile unit such as a camper-trailer, the combination of a mobile body member, reservoir means in said body member for storing and dispensing a liquid, a compartment accessible from one side of said body member, reel means for supporting a hose mounted in said compartment, nonflexible conduit means mounted on said reel means for attachment to said reservoir means, additional nonflexible conduit means connected with said first conduit means, an extensible outlet fitting, means for directly connecting said extensible outlet fitting to said additional conduit means, sleeve means forming a second compartment in said body member positioned adjacent said first compartment in a position to receive said additional conduit means, sleeve means forming a having an opening normally closed by said extensible fitting, and cover means for closing said first compartment.

References Cited

UNITED STATES PATENTS

| | | | |
|---|---|---|---|
| 290,806 | 12/1883 | Shaffer | 137—355.19 |
| 1,075,014 | 10/1913 | Cooney | 137—355.19 XR |
| 1,524,172 | 1/1925 | Dewey | 137—355.19 |
| 1,971,165 | 8/1934 | Parker | 137—355.26 |
| 2,193,288 | 3/1940 | Liley | 137—355.19 |
| 2,477,769 | 8/1949 | Rice | 137—351 XR |
| 3,050,078 | 8/1962 | Hooper | 137—355.19 |
| 3,183,927 | 5/1965 | Weese et al. | 137—355.19 |
| 3,199,529 | 8/1965 | Fracassi | 137—355.26 |

SAMUEL SCOTT, *Primary Examiner.*